April 25, 1967 G. A. SHIRN ETAL 3,316,133
PROCESS FOR ALUMINUM CAPACITOR ELECTRODES
Filed Jan. 31, 1964
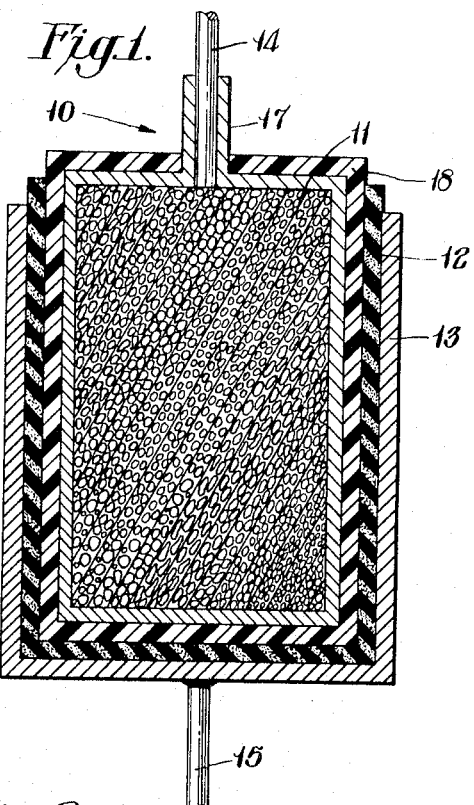
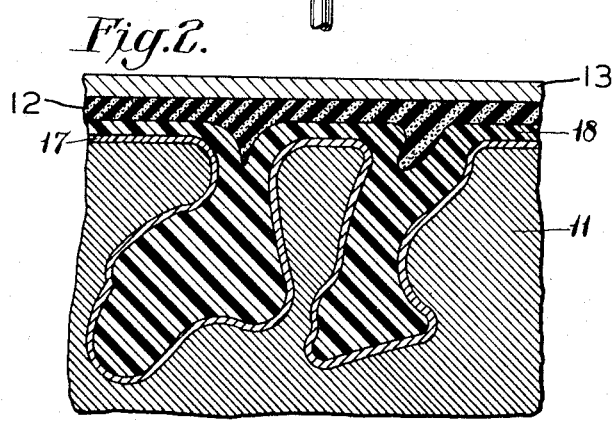
INVENTORS
GEORGE A. SHIRN
WILLIAM J. PFISTER
BY *Connolly and Hutz*
THEIR ATTORNEYS

United States Patent Office 3,316,133
Patented Apr. 25, 1967

3,316,133
PROCESS FOR ALUMINUM CAPACITOR ELECTRODES
George A. Shirn, Williamstown, and William J. Pfister, Cheshire, Mass., assignors to Sprague Electric Company, North Adams, Mass., a corporation of Massachusetts
Filed Jan. 31, 1964, Ser. No. 341,599
2 Claims. (Cl. 156—2)

This invention relates to porous aluminum electrodes and more particularly to a process for making porous aluminum pellet electrodes.

Unlike tantalum particles, aluminum particles are not readily sinterable to a form-retaining porous body. This is caused by the thermal oxide layer which forms on each particle of aluminum as soon as it contacts oxygen. The oxide layer, which is insoluble in molten aluminum, prevents a metal to metal contact and/or interdiffusion and thus inhibits the sintering effect. Tantalum also has an oxide layer, but the oxide is very soluble in the hot metal. Thus, when the tantalum particles are heated, the oxide layer dissolves in the metal and the sintering process can occur.

The principal object of the invention is to provide an electrically continuous but physically porous aluminum electrode.

Another object is a process for making a porous aluminum pellet for use as a capacitor anode.

FIGURE 1 is a vertical cross-section of a solid electrolyte capacitor employing the porous aluminum electrode of this invention.

FIGURE 2 is a diagrammatic representation of a magnified cross-section of the capacitor section of FIGURE 1.

The principal object of the invention is achieved by forming an intimate mixture of a continuous phase of molten aluminum with a leachable member of the group consisting of (a) at least one molten immiscible metal, (b) at least one nonmolten, metal wool, and (c) mixtures thereof; solidifying said mixture and leaching said member from the aluminum.

Since aluminum oxide, as a dielectric, is very sensitive to impurities, the leachable material employed in forming the pores of the electrode must not poison the aluminum. In other words, this component must either be insoluble enough to leave less than a tolerable amount of impurity in the aluminum or be of a type which would not affect the dielectric properties of aluminum oxide.

Representative of the material employed in molten form with molten aluminum in the process of the present invention are thallium, bismuth, cadmium, potassium, sodium, lead, cesium and gallium.

In the embodiment employing a molten immiscible, metal, an intimate mixture with aluminum is formed in the following manner: The metal and aluminum are preferably placed in a controlled atmosphere, e.g. a partial vacuum, nitrogen, etc. in order to minimize oxidation. Both materials are melted and while both are in the molten state they are violently agitated. The agitation may be effected by mechanical shaking, ultrasonic vibration or any means which will bring about a mingling or intimate mixture of the immiscible metal with the molten aluminum. While the two molten metals are being agitated they are subjected to a rapid decrease in temperature. The solidified mass is then placed in a material which will leach, dissolve or otherwise react with, the immiscible metal and thereby remove said material from the aluminum. The resulting aluminum mass will have myriad interstices and pores.

*Example 1*

Aluminum and 15% by volume of thallium were melted together in an evacuated quartz tube. The molten metals were violently agitated and while so agitated, rapidly cooled to solidify the mix. The solidified pellet was placed in 50% nitric acid until all reaction ceased. An excellent porous body resulted. This pellet was then anodized in a commercial electrolyte and a good dielectric film of 380 volts thickness was obtained.

Referring to the drawing, FIGURE 1 depicts a capacitor 10 employing a porous anode 11 made according to the above process. A lead 14 is affixed to said anode. A dielectric film 17, e.g. aluminum oxide, is formed on all the surfaces of anode 11. In intimate contact with this dielectric film is a semiconductive layer 18, e.g. lead oxide, manganese oxide, etc. An optional contact layer 12, e.g. graphite, is applied to the semiconductive layer. A contact electrode 13, e.g. silver, is the final layer. A lead 15 is affixed to layer 13. The entire unit may be encased in a metal can having a glass-to-metal end seals.

FIGURE 2 graphically illustrates a magnified cross-section of part of the unit of FIGURE 1. This figure shows the character of and relationship between the several layers. Dielectric oxide 17 is shown lining the pore surfaces of anode 11. Semiconductive layer 18 substantially fills the oxide-coated pores. Contact layer 12 and contact electrode 13 complete the capacitor.

It is to be understood that the aluminum electrode of the present invention can be employed in an electrolytic capacitor by anodizing the electrode and sealing it in a cathode container containing an electrolyte.

Representative of the metal employed in nonmolten metal wool form along with molten aluminum in the process of the present invention are nickel wool, iron or steel wool, copper wool, brass wool and bronze wool. The term "wool' is used in the sense of fibers, wires, strands, etc., having an average fiber diameter of about 0.5–20 mils.

This embodiment is much the same as that illustrated by Example 1 except that the leachable material is not permitted to melt. As soon as the aluminum is melted and the metal wool thoroughly dispersed throughout said aluminum, the system is solidified. Thereafter the fibrous material is leached from the aluminum as in Example 1.

*Example 2*

Nickel wool or wire having an average diameter of about 5 mils was intimately mixed with molten aluminum. The mixtrue was cooled to solidify the mass. The solid body was placed in 50% HNO₃ until all reaction ceased. An excellent porous body resulted. The porous body was then anodized in a commercial electrolyte to a thickness of 300 volts.

As used herein the terms "leach" and "leachable" not only refer to the removal of the immisicible and/or fibrous material by dissolution thereof in an appropriate solvent but also by reaction of said material with an appropriate reagent. Among the leaching materials contemplated are water and the mineral acids, nitric, sulfuric, hydrochloric, hydrofluoric, phosphoric, etc.

As is evident from the foregoing, the invention is not to be limited to formation of the rather specific illustrative device. Modifications and variations, as well as the sub-

What is claimed is:

1. The process of making a porous aluminum pellet electrode comprising forming an intimate mixture of a continuous phase of molten aluminum with a leachable, molten immiscible metal of the group consisting of thallium, bismuth, cadmium, potassium, sodium, lead, cesium and gallium; and a leachable nonmolten, metal wool of the group consisting of nickel wool, steel wool, copper wool, brass wool and bronze wool; solidifying said mixture and leaching said leachable metals from said aluminum.

2. The process of claim 1 wherein said forming step and said solidifying step include the steps of agitating said mixture while decreasing the temperature of said mixture.

References Cited by the Examiner

UNITED STATES PATENTS

| | | | |
|---|---|---|---|
| 2,206,050 | 7/1940 | Robinson | 29—25.31 |
| 2,299,228 | 10/1942 | Gray | 29—25.31 X |
| 2,474,201 | 6/1949 | Raymond. | |
| 3,029,370 | 4/1962 | Hill | 317—230 |
| 3,138,856 | 6/1964 | Kuchek | 75—20 X |
| 3,202,552 | 8/1965 | Thexton | 156—18 X |
| 3,236,706 | 2/1966 | Kuchek | 156—2 |

JOHN F. CAMPBELL, *Primary Examiner.*

WILLIAM I. BROOKS, *Examiner.*